United States Patent [19]

Barrett et al.

[11] Patent Number: 5,584,033
[45] Date of Patent: Dec. 10, 1996

[54] APPARATUS AND METHOD FOR BURST DATA TRANSFER EMPLOYING A PAUSE AT FIXED DATA INTERVALS

[75] Inventors: Wayne M. Barrett, Rochester; Bruce L. Beukema, Hayfield; William E. Hammer; Daniel F. Moertl, both of Rochester, all of Minn.

[73] Assignee: International Business Machines Corporation, Armonk, N.Y.

[21] Appl. No.: 335,228

[22] Filed: Nov. 7, 1994

Related U.S. Application Data

[63] Continuation of Ser. No. 760,426, Sep. 16, 1991, abandoned.
[51] Int. Cl.$^6$ ............................................. G06F 13/28
[52] U.S. Cl. ............... 395/800; 364/260; 364/271.5; 364/260.1; 364/DIG. 1; 395/868
[58] Field of Search ........................... 395/800, 868

[56] References Cited

U.S. PATENT DOCUMENTS

| | | | |
|---|---|---|---|
| Re.34,282 | 6/1993 | Suzuki | 395/425 |
| 4,275,440 | 6/1981 | Adams | 395/868 |
| 4,558,429 | 12/1985 | Barlow | 395/425 |
| 4,644,463 | 2/1987 | Hotchkin | 395/250 |
| 4,703,478 | 10/1987 | Haselton | 370/94 |
| 4,712,176 | 12/1987 | Fredericks et al. | 364/200 |
| 4,799,199 | 1/1989 | Scales, III et al. | 365/230 |
| 4,807,109 | 2/1989 | Farrell et al. | 364/200 |
| 4,816,947 | 3/1989 | Scales | 395/325 |
| 5,029,124 | 7/1991 | Leahy et al. | 370/85 |
| 5,073,969 | 12/1991 | Shoemaker | 395/307 |
| 5,140,680 | 8/1992 | Best | 395/325 |
| 5,159,672 | 10/1992 | Salmon | 395/325 |
| 5,276,818 | 1/1994 | Okazawa | 395/325 |

OTHER PUBLICATIONS

IBM Technical Disclosure Bulletin vol. 30 No. 4 Sep. 1987 pp. 1432–1434 "Swinging Buffer With Programmable Size".

*Primary Examiner*—Eric Coleman
*Attorney, Agent, or Firm*—Roy W. Truelson; Owen J. Gamon; Karuna Ojanen

[57] ABSTRACT

A plurality of devices attached to a communications bus observe a burst transfer protocol which allows pausing only at pre-determined, fixed intervals of n data words, where a word is the width of the bus. In accordance with this protocol, once burst transfer is initialized the sending device transmits an uninterrupted stream of n data words over the communications bus, after which either the sender or receiver may cause transmission to pause. The sender may need to wait for more data, or the receiver may need to finish processing the data just received. The pause lasts as long as needed until both devices are ready to proceed. This cycle is repeated until the data transmission is complete. The sending and receiving devices do not relinquish control of the bus during a pause, and therefore are not required to re-initialize communications. In the preferred embodiment, after n data words have been transmitted, the sender and receiver toggle interlocking signals that accomplish a handshaking between the two devices. The sender de-activates its signal when it is ready to send more, and the receiver de-activates its signal when it is ready to receive more. Both devices are equipped with buffers large enough to hold n data words, but the buffers need not be as large as the longest possible burst communication.

30 Claims, 5 Drawing Sheets

APPARATUS AND METHOD FOR BURST DATA TRANSFER EMPLOYING A PAUSE AT FIXED DATA INTERVALS

This application is a continuation of application Ser. No. 07/760,426 filed Sep. 16, 1991, now abandoned.

FIELD OF THE INVENTION

The present invention relates to computer communications, and in particular to improving the speed and reducing the cost of burst communications between different devices in a computer system.

BACKGROUND OF THE INVENTION

Modern computer systems support communications at many different levels. An individual computer comprises a variety of different processors communicating with each other. A single central processing unit (CPU) is typically the basic workhorse of the computer, but other processors control disk storage devices, printers, terminals, communications with other computers, etc. Even more remote and primitive processors may control other functions, such as monitoring sensors, input keypads, etc. In addition, multiple computer systems may be connected to s network, whereby they may communicate with each other. Each of these processors or systems must have some defined path for communications.

Design requirements for communications paths vary. A typical computer system will have several paths which must support high speed mass data transfer. For example, when a block of code is loaded from a magnetic disk storage device into main memory, the volume of data being transferred requires a very fast, efficient mechanism.

To support mass data transfer operations, most computer systems employ some form of burst data transfer protocol. A burst protocol typically comprises an initialization part, a data transfer part, and a concluding part. In the initialization part, the sender informs the receiver of the pending transmission, providing information necessary for the receiver to prepare itself. For example, the sender may tell the receiver the number of bytes to be transferred, a forwarding destination for the data, etc. The receiver may be required to acknowledge receipt of initialization information before the sender can start transmitting the main body of data. In some protocols, initialization will involve several exchanges between sender and receiver. After initialization is complete, the sender sends the data, without further intervening exchanges. When all data has been transmitted, the concluding part of the transmission occurs. The receiver will typically perform some error checking of the transmission, as for example, by verifying parity bits, or that the correct number of bytes were received. The receiver will then send an acknowledgment message to the sender, indicating either that the data was received without error or that some error was detected. As in the case of initialization, the concluding part may involve more than a single exchange between sender and receiver. Although there is some overhead associated with the initialization and concluding phases, in the case of a large data transfer this overhead is offset by the fact that the data transfer phase is large in comparison to the other two phases.

The essential feature of burst communication is that the data transfer takes place at high speed and without interruption. This feature places certain constraints on the design of the sender and receiver devices. On the one hand, it is desirable that both devices operate as fast as the physical limitations of the devices will permit. On the other hand, the devices must be able to-keep up with each other or communication errors will result. A typical system communications bus may have a variety of devices of different types attached. Because these devices perform different functions,, they will not all be able to produce or consume data at the same rate. If each device is allowed to produce or consume data at the fastest rate possible for that device, the slower devices will not be able to keep up with the faster devices. If all devices are slowed to the rate of the slowest device on the system, the performance of the system will become unacceptably slow.

The problem of differing speed devices is sometimes addressed by including large buffers in each device to avoid overflow or underflow of data. To guarantee that the device can keep up, the buffer must be large enough to hold the largest possible burst data transfer. This requires a design trade-off between buffer size and maximum packet size of the burst data transfer. From a performance standpoint, it is desirable to have the largest possible maximum packet size to reduce the overhead of transferring large data blocks. From a cost standpoint, it is desirable to have a small packet size so that only a small buffer is required. Moreover, even buffers are not a complete solution to the problem. It is still necessary to have bus interface circuitry operating at the same speed on each card, sufficiently fast to empty or fill the buffer at the speed of the data transfer, so that design of I/O devices is still constrained.

Another approach to the problem of differing speed devices is to allow either device to trigger a pause at any point during the transmission. This requires that the devices be prepared to accept a pause indication after each word of data is transferred on the bus, which is typically accomplished with some form of handshaking exchange between the devices. Unfortunately, this reduces the speed of the data transfer (even where no pause indication is present), and adds complexity to the logic that must be present in the devices to handle the pauses. In effect, allowing a pause at any point defeats the purpose of burst transmission, which is to send data a rapidly as possible in an uninterrupted stream.

In the design of a communications bus, it is desirable to permit a variety of different types of devices operating at varying speeds to be attached to the bus, and to utilize the high speed characteristics of high speed devices, while still permitting low speed devices to be attached to the system. It is also desirable to avoid transmission overflows in the receiver's buffer, or underflows in the sender's buffer, without the need for large buffers. A variety of different communications protocols exist. However, these either require more hardware than minimally necessary or otherwise unduly constrain the performance or characteristics of the system.

SUMMARY OF THE INVENTION

It is therefore an object of the present invention to provide an enhanced method and apparatus for communicating among a plurality of devices attached to a communications bus.

Another object of this invention is to increase the performance of a system having a communications bus and a plurality of devices attached thereto.

Another object of this invention is to reduce the design constraints of devices attached to a communications bus.

Another object of this invention is to reduce the design complexity of devices attached to a communications bus.

Another object of this invention is to increase the speed of information transmission between devices attached to a communications bus.

Another object of this invention is to reduce the cost of a system having a communications bus add a plurality of devices attached thereto.

A plurality of devices attached to a communications bus observe a burst transfer protocol which allows pausing only at pre-determined, fixed intervals of n data transfer cycles, where, in the preferred embodiment, one word, being the width of the bus, can be transferred in one data transfer cycle. In accordance with this protocol, a sending device and a receiving device obtain control of the bus to establish a burst transfer communication. Once burst transfer is initialized, the sending device transmits an uninterrupted stream of n data transfer cycles over the communications bus. After a predetermined number of n data transfer cycles, where n is greater than one, either the sender or receiver may cause transmission to pause. The sender may need to wait for more data, or the receiver may need to finish processing the data just received. The pause lasts as long as needed until both devices are ready to proceed. The sender then transmits another n data transfer cycles, and the devices pause as required until they are both ready. This cycle is repeated until the data transmission is complete.

The sending and receiving devices do not relinquish control of the bus during a pause, and therefore are not required to re-initialize communications. In the preferred embodiment, after n data words have been transmitted, the sender and receiver toggle interlocking signals that accomplish a handshaking between the two devices. The sender de-activates its signal when it is ready to send more, and the receiver de-activates its signal when it is ready to receive more. Generally, the pause will be of a relatively short duration, and the overhead associated with terminating the data transfer and re-initializing would considerably outweigh the effects of the pause.

Bus devices must be equipped with buffers large enough to hold the data within n data transfer cycles, but the buffer need not be any larger than this. The choice of optimum size of n involves a trade-off between buffer size and the overhead associated with handshaking and pausing as necessary. Because the overhead associated with handshaking is far less than the overhead of terminating and re-establishing a burst communication, the buffer can be made much smaller than is normally required to support burst communication without pausing. Furthermore, the total length of a burst communication is not limited by buffer size, making much longer burst communications possible. In the preferred embodiment, n is 32 data transfer cycles.

Because the sending device transmits an uninterrupted stream of n data transfer cycles, it can guarantee that sufficient space will be available in its buffer for the next data transfer cycles stream within a specific time period. As a result, it can overlap the action of obtaining more data (refilling the buffer) with the action of transmitting the current data (emptying the buffer). Furthermore, allowing pauses only at specific intervals simplifies the bus interface circuitry because the number of potential cases (or scenarios) involving pauses is drastically reduced.

DETAILED DESCRIPTION OF THE PREFERRED EMBODIMENT

Figure 1:
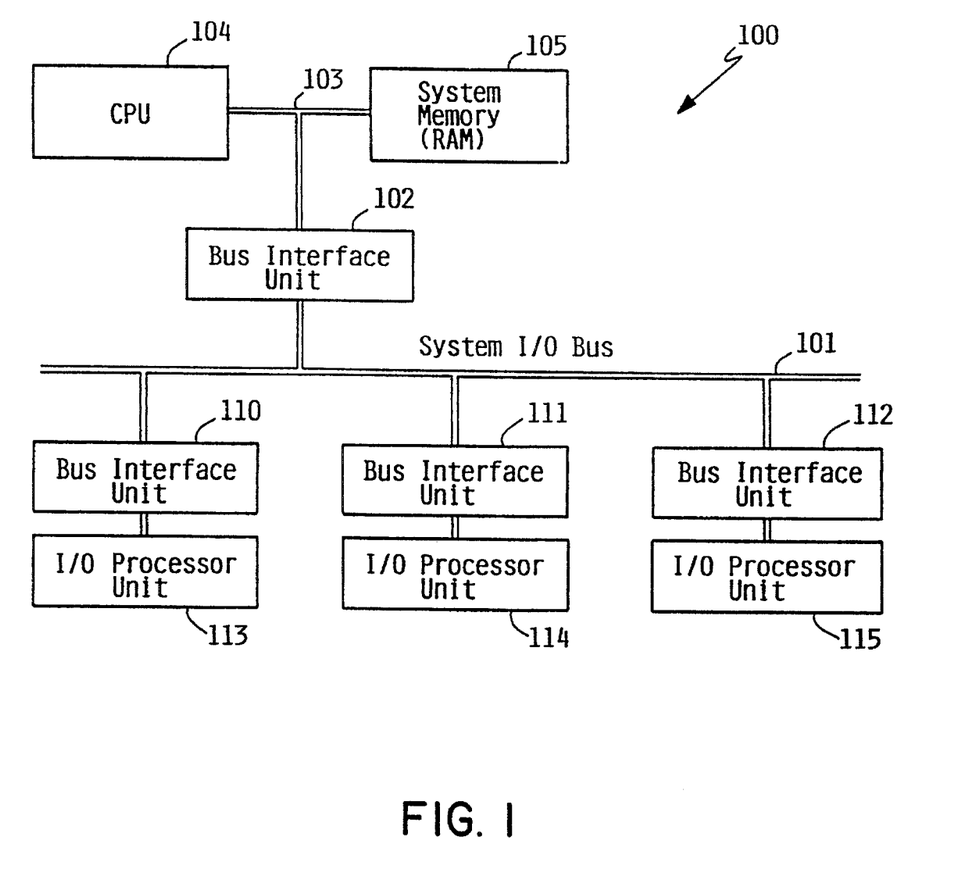
FIG. 1 shows the major components of a computer system employing a burst transfer protocol according to the preferred embodiment of this invention.

A diagram of the major components of a computer system employing a burst transfer protocol according to the preferred embodiment of the present invention is shown in FIG. 1. Computer system 100 comprises system I/O bus 101, to which are attached a plurality of bus interface units 102, 110-2. Bus interface unit 102 couples a system processor bus 103 to system I/O bus 101. System central processing unit (CPU) 104 and system random access memory 105 are connected to system processor bus 103. Bus interface units 110-2 couple respective I/O processor units 113-5 to system I/O bus 101. Buses 101 and 103, together with bus interface units 102, 110-2, establish a communications path between any two I/O processor units, or between CPU 104 or memory 105 and any I/O processor unit.

Each I/O processor unit 113-5 handles communications with one or more I/O devices (not shown). These I/O devices may, for example, be magnetic disk drive units, magnetic tape drive units, interactive workstations, printers, etc., which are attached to system 100. In the alternative, an I/O processor unit may handle communications with other computer systems via a local area network or remote communications lines. I/O processor unit 113-5 is shown separately from their respective bus interface units 110-2 in FIG. 1 to illustrate the division of function. In the preferred embodiment, the I/O processor unit and its bus interface unit may be contained in a single circuit card assembly, a portion of the circuitry on said assembly comprising the bus interface unit, and another portion comprising the I/O processor unit. While I/O processor units 113-5 are shown generically in FIG. 1, it should be understood that different types of I/O processor units may exist with system 100, and that the number of such units may vary. In addition, system 100 may comprise multiple CPUs and memory units communicating with other units via system I/O bus 101. In the preferred embodiment, system 100 is an IBM Application System/400 computer system, it being understood that other systems could be used.

Figure 2:
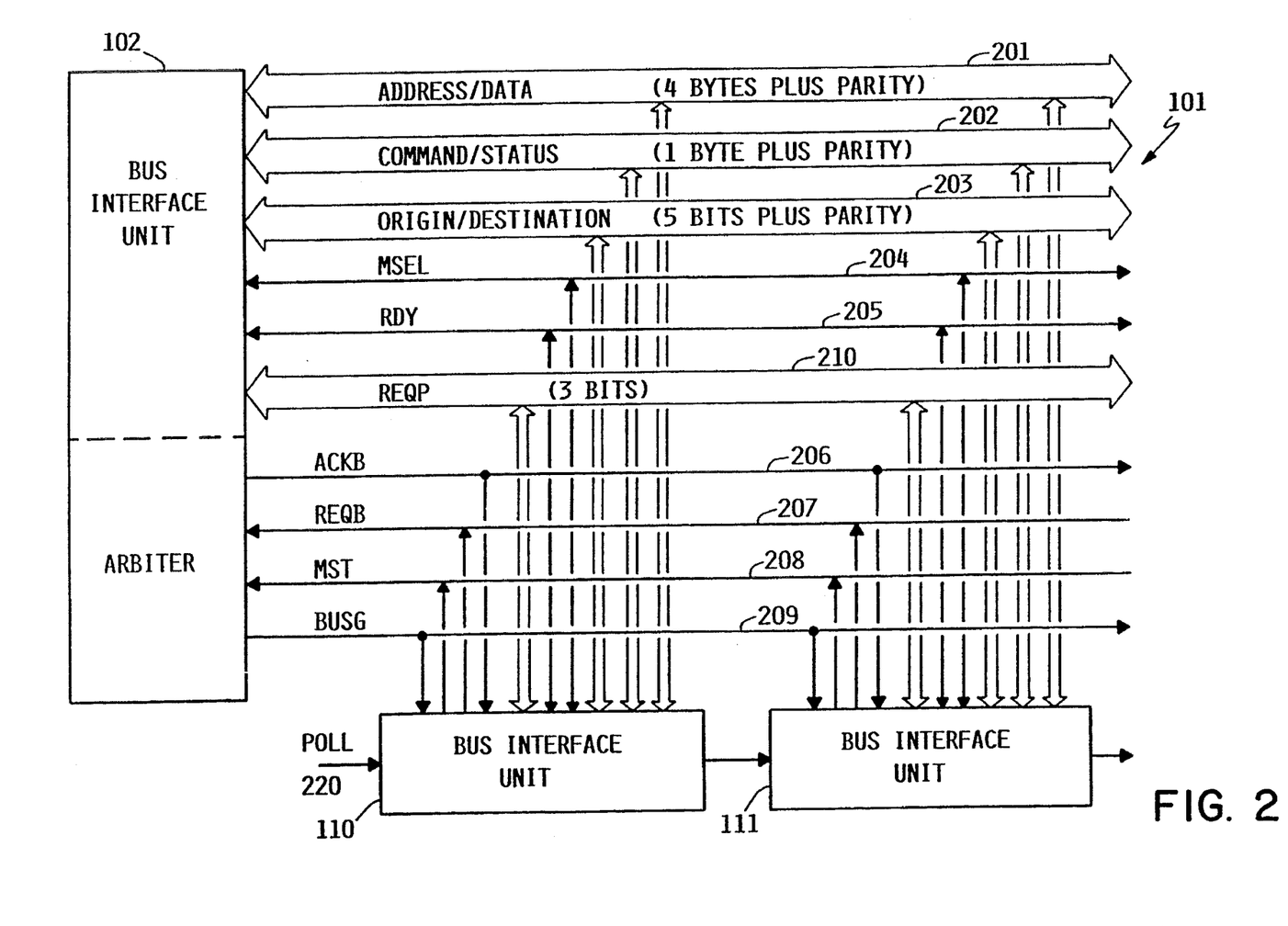
FIG. 2 shows in greater detail the structure of a system I/O bus employing a burst transfer protocol according to the preferred embodiment of this invention.

The structure of system I/O bus 101 of the preferred embodiment is shown in greater detail in FIG. 2. System I/O bus 101 is a bi-directional bus comprising address/data bus portion 201, command/status bus portion 202, origin/destination bus portion 203, MSEL line 204, RDY line 205, ACKB line 206, REQB line 207, MST line 208, BUSG line 209, and REQP portion 210. Address/data bus portion 201 carries the actual data bits being transmitted by bus 101; it comprises 32 data lines (4 bytes) and four parity lines. Command/status bus portion 202 carries command and status information with respect to a data transfer; it comprises 8 command/status lines and one parity line. Origin/destination bus portion 203 carries information identifying a bus unit, and is used to identify the originator of an operation or destination of a command. It comprises 5 bus unit identifier lines and one parity line. MSEL ("Master Select")

204 and RDY ("Ready") 205 are bi-directional lines used in handshaking between the sending and receiving devices. ACKB ("Acknowledge Bus") 206, REQB ("Request Bus") 207, and BUSG ("Bus Grant") 209 are uni-directional lines used to arbitrate control of the bus. MST ("Master Steering") 208 is a uni-directional line used by the master to hold control of the bus. REQP ("Request Priority") portion 210 comprises three bi-directional lines used for communicating a priority level with a request for control of the bus. Poll 220 is serially propagated to the individual bus units; this line is used for bus arbitration. Bus 101 comprises additional lines (not shown) which are used for error recovery or other functions not part of the invention described herein. Because bus 101 supports the transfer of 4 bytes in parallel, a data word is defined as 4 bytes (32 bits) of information and this is the amount of data that can be transferred in one data transfer cycle.

Figure 3:
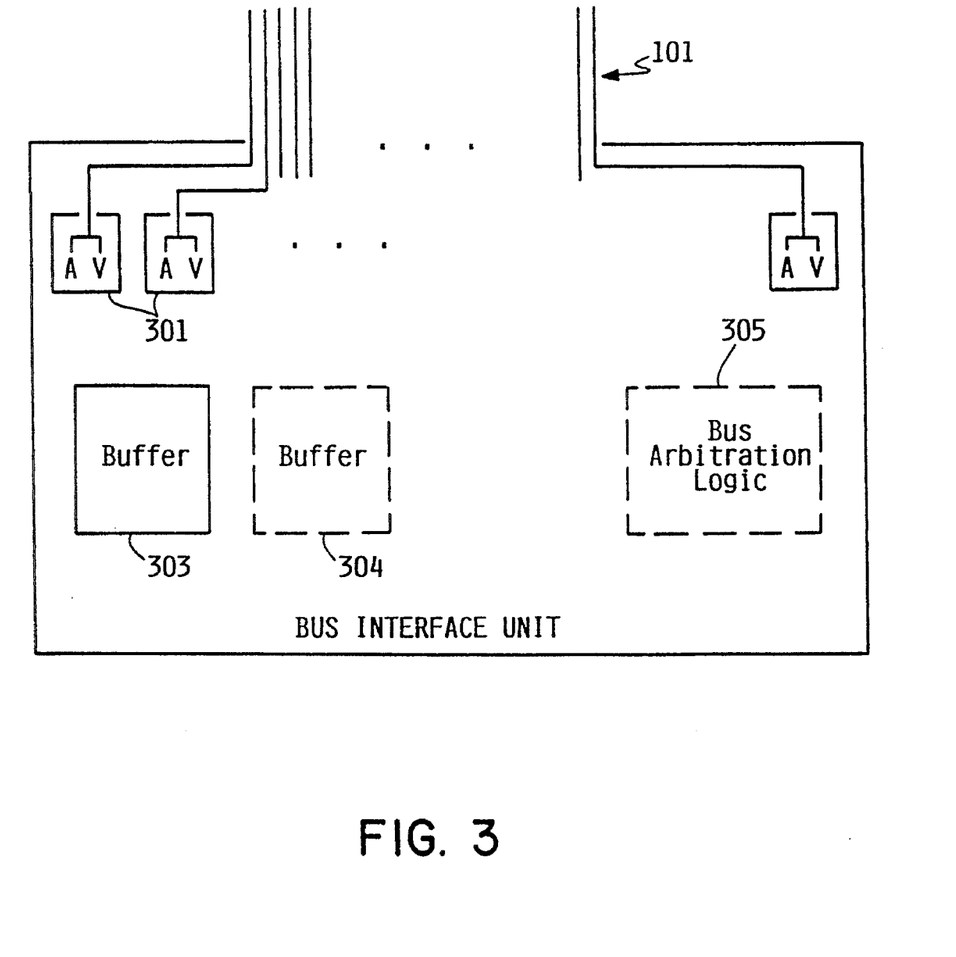
FIG. 3 sows the major components of a typical bus interface unit according to the preferred embodiment.

FIG. 3 shows the major components of a bus interface unit, such as any of units 102, 110–112 shown in FIG. 1. Bus 101, comprising a plurality of individual bidirectional lines, is physically connected to the bus interface unit. Each line of bus 101 is connected to a separate high impedance driver circuit 301. A buffer 303 contains a plurality of memory cells, sufficient to hold n data words, where n is the number of data words transmitted between each potential pause point. In the preferred embodiment, n is 32. Bus interface unit may optionally contain additional buffers 304. One of the bus interface units contains bus arbitration logic 305. Bus arbitration logic 305 manages the bus by granting control for a limited time to a requesting bus interface unit, following a predefined bus arbitration protocol. In the preferred embodiment, arbitration logic 305 is located in bus unit 102 coupling the system I/O bus 101 with system processor bus 103. However, arbitration logic could alternatively be in any bus unit, or in a dedicated arbitration unit which does not itself transmit data on the bus.

A variable number of bus interface units can be attached to bus 101. When receiving data or when idle, high impedance driver circuits 301 of each bus interface unit are in a high impedance state. This high impedance state allows another bus unit to send signals on the bus without interference, and at the same time permits the bus unit (not sending signals) to receive bus signals. When active, high impedance driver circuit 301 can act in driver mode to send a signal on the bus line. The design of such high impedance driver circuits is known in the art.

Figure 4:
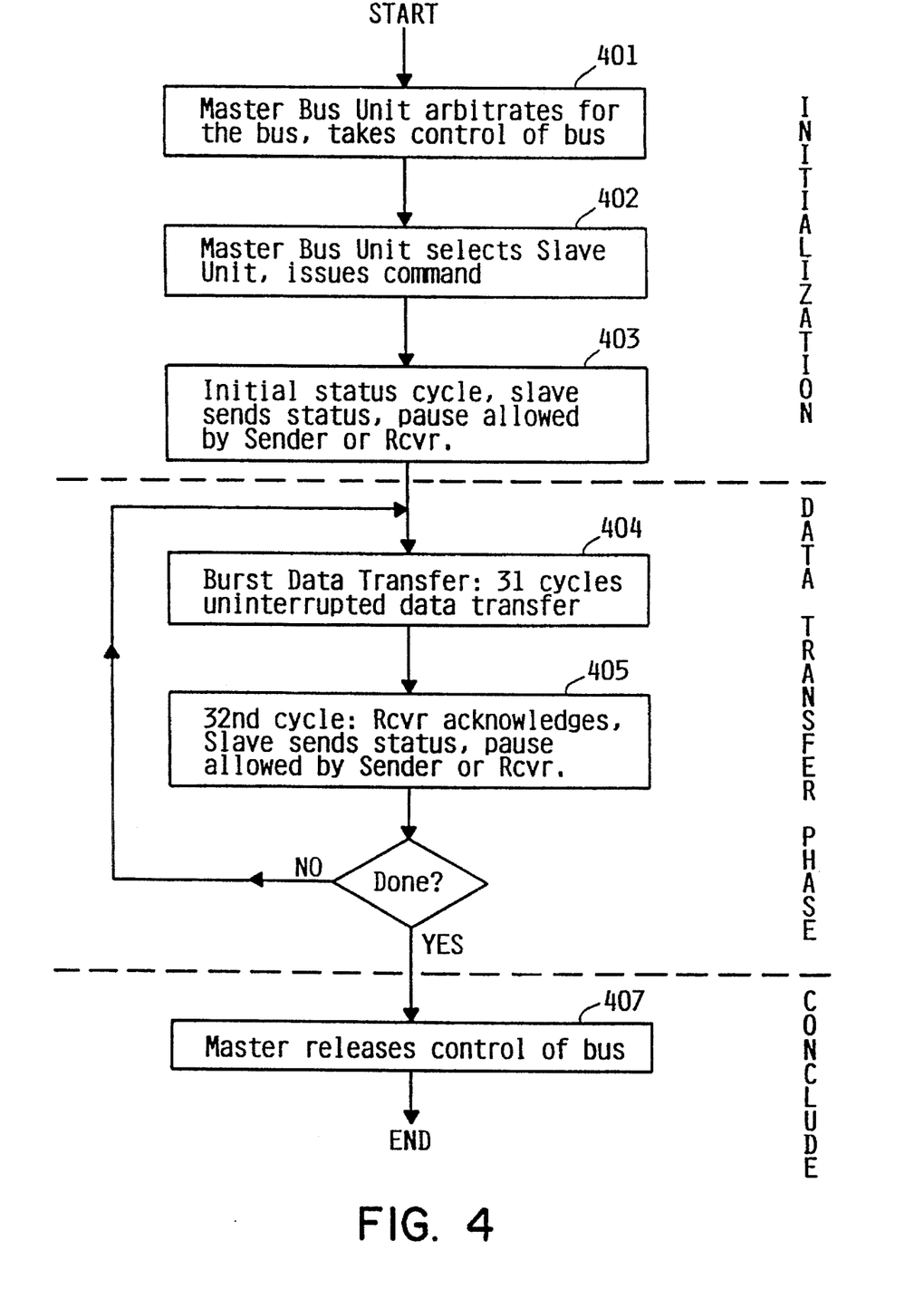
FIG. 4 shows the steps required to transfer data in a burst protocol according to the preferred embodiment.

The protocol for transferring data according to the preferred embodiment will now be described. FIG. 4 shows the steps required to transfer data on bus 101. For purposes of the data transfer operation, the bus unit requesting a data transfer is referred to as the "master". The bus unit to which a request is directed is the "slave". The master may be either a sender or a receiver of data, depending on whether the requested operation is a write or a read. The designations "master", "slave", "sender" and "receiver" are applicable only to a specific data transfer operation. Each bus interface unit is capable of acting either as master or slave, sender or receiver of data.

A data transfer operation contains an initialization phase, a data transfer phase, and a conclusion phase. The initialization phase commences when a bus interface unit requests control of the bus for purposes of initiating the transfer. The first step is for the requesting unit to gain control of the bus (becoming "master" for purposes of the operation), at 401. Bus arbitration logic 305 recognizes the request and, through an established protocol, described more fully below, grants control of bus 101 to the requesting unit, which then becomes the master. The master unit then issues the appropriate data transfer command to the slave at 402. The slave to which the command is directed responds by sending its status to the master at 403. At this point the receiving unit may elicit a pause by holding a defined signal line active. When the line is de-activated, the data transfer phase is ready to begin.

In the data transfer phase, the sender transmits 32 words of data in successive cycles, without interruption, at step 404. Each word is the amount of data the bus can support in a single cycle, i.e. the number of parallel data lines in the bus. In the preferred embodiment, address/data portion comprises 32 lines (4 bytes) of data. Since 4 bytes are transmitted with each cycle, a total of 128 bytes are transmitted by the sender in 32 cycles.

On the 32nd data transfer cycle, the slave sends its status to the master at step 405. The receiver may then elicit a pause by holding a defined signal line active. The pause continues as long as the signal line is active. The deactivation of the line is the receiver's indication that it is ready to continue. The sender may also pause if necessary until it is ready to continue. If more data remains to be transferred (step 406), the sender resumes by transmitting another 32 words in uninterrupted cycles at step 404. Steps 404–406 are repeated until all data has been transferred. When the data transfer phase is complete, the master relinquishes control of the bus at 407 (the conclusion phase).

In the preferred embodiment, the bus unit desiring to initiate a transfer requests control of the bus by activating REQB line 207. Arbitration logic 305 detects the activation of REQB line 207 and responds by activating ACKB line 206 and BUSG line 209. At the same time, poll 220 is activated. Each bus interface unit in turn propagates a signal on poll line 220 until a bus unit requesting the bus is encountered. This bus unit (at which the poll is halted) then activates MST line 208 and MSEL line 204, and deactivates REQB line 207, effectively assuming the role of master. Arbitration logic 305 responds by deactivating ACKB line 206, and later deactivates BUSG line 209, completing arbitration step 401.

The arbitration sequence described above is designed to ensure that only one bus unit can become master at any one time. If more than one bus unit activate REQB line 207 more or less simultaneously, the first bus unit to receive the poll will become master. This order can be modified by use of REQP portion 210. A bus unit can activate a line in REQP portion to indicate a priority associated with its bus request. Any unit receiving the poll must then have a bus request of as high a priority as the highest priority request made via REQP bus portion 210 to become master; otherwise, it must propagate the poll to the bus unit with the higher priority request.

It should be understood that the description above is only an overview of the arbitration protocol of the preferred embodiment, the actual protocol containing additional defined sequences for recovery from errors and other conflict resolution, as is known in the art. The essential feature of the arbitration sequence is that only one bus unit can become master at any one time; the implementation details are not critical to the invention claimed herein. It would be possible to practice this invention with other arbitration protocols.

In the preferred embodiment, when the master bus unit activates MST line 208 during the arbitration sequence, it also drives command/status bus portion 202 and origin/destination bus portion 203 with identifier data corresponding to the desired command and slave unit, respectively, All bus units are listening to the sequence of bus signals, and will know that this is the signal for the slave unit to respond. The slave unit identified by the data on origin/destination bus portion 203 responds by activating RDY line 205. The master unit acknowledges this response by deactivating MSEL line 204. The slave unit then deactivates RDY line 205, completing slave selection step 402.

With arbitration and selection complete, the master and slave units then perform an initial status cycle prior to data transfer. The master unit activates MSEL line 204, requesting status from the slave. The slave unit responds by driving command/status bus portion 202 with status data, and activates RDY line 205 after a predefined delay. The master unit reads status and deactivates MSEL line 204 when it is ready for the data transfer phase to begin. The slave unit deactivates RDY line 205 when it is ready. Either the master or slave unit may force a pause at this point by holding MSEL or RDY line active, respectively. When the master deactivates MSEL and the slave deactivates RDY line 205, initial status cycle 403 is completed and the data transfer phase is ready to begin.

Except for minor details unrelated to the substance of the invention claimed herein, the protocol during the initialization phase is the same whether the command calls for transfer of data from master to slave (WRITE command) or for transfer of data from slave to master (READ command). During data transfer phase, each bus unit controls a separate line for the purpose of timing and acknowledgment, designated the handshake line. The master unit controls MSEL line 204 which is its handshake line. The slave unit controls RDY line 205, which is its handshake line. The protocol for WRITE commands and READ commands is similar, but the role of MSEL and RDY lines are reversed due to the reversed roles of their respective controlling bus units.

Figure 5:
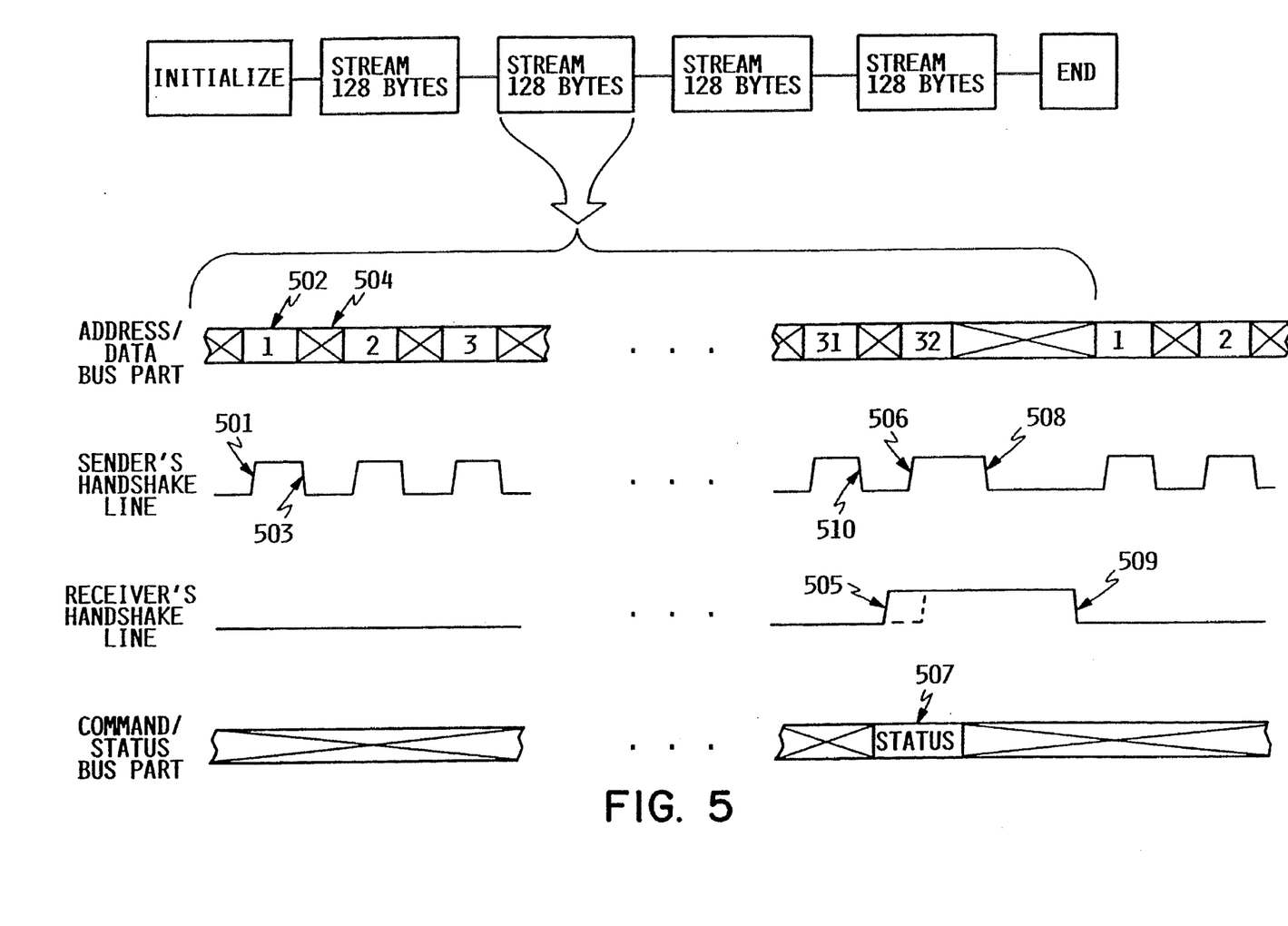
FIG. 5 shows the actions of key portions of the bus during data transfer phase according to the preferred embodiment.

The operation of the handshake lines in conjunction with address/data bus part 201 and command/status bus part 202 during the data transfer phase is illustrated in FIG. 5. After initialization is complete, data transfer proceeds in 128-byte bursts as follows. The sender bus unit (which may be either the master or slave) activates its handshake line (501), which would be MSEL line 204 in the case or a WRITE, and RDY line 205 in the case of a READ. The sender must drive address/data bus portion 201 with the first four bytes of data to be transferred (502) a predefined setup time period before activating its handshake line to ensure data is valid at the time the line is activated. The receiver must accept the data on address/data bus portion 201 within a predefined hold time period after the activation of the sender's handshake line. The sender deactivates its handshake line after a predefined stability period (503). The sender's handshake line remains inactive for the predefined stability period, after which it repeats the cycle to transfer another four bytes of data. Sometime after the predefined hold period following activation of the sender's handshake line on the first cycle, and before a predefined setup period before activating the handshake line on the second cycle, the sender drives address/data bus portion 201 with four more bytes of data for the second cycle. The gap in time when the first four bytes of data is valid and the second four bytes is valid on address/data bus part 201 is shown in FIG. 5 as crossed area 504, indicating that the receiver should not attempt to read the bus during this period. The cycle repeats 31 times, effecting the transfer of 124 bytes. During this period, the receiver's handshake line is inactive. The receiver plays a completely passive role, simply receiving data on address/data bus portion 201 at the cycle intervals indicated by the rise and fall of the sender's handshake line.

After the sender deactivates its handshake line to end the 31st cycle (510), the receiver activates its handshake line (505). The master activates its handshake line on the 32nd cycle before the slave. Thus, where a READ operation is in progress (slave is sender), the receiver activates its handshake line (505) first, then the sender activates its line (506) for the 32nd cycle. Where a WRITE operation is in progress (master is sender), the sender activates its line (506) before the receiver activates its line (505). The sender drives address/data bus portion 201 with 4 more bytes of data, and activates its handshake line, as in the previous 31 cycles. In addition, the slave unit (either sender or receiver) drives command/status bus portion 202 with status data (507), which is read by the master unit. At this point, either bus unit may cause a pause in transmission by holding its respective handshake line active. When the sender is ready to proceed, it deactivates its handshake line (508). When the receiver is ready and after the deactivation of the sender's line, the receiver deactivates its handshake line (509), completing the 32nd cycle, including any pause (step 405).

If there is more data to transfer, the sender commences another series of burst transfer cycles as described above; if not, the bus units begin the conclusion phase. FIG. 5 illustrates a 512 byte transfer containing four 128-byte streams, it being understood that the length of the data transfer could be other than 512 bytes. In the preferred embodiment, the concluding phase is merely the release of control of the bus by the master, which is accomplished by deactivating MST line 208 after a predefined waiting period. The MSEL, MST and RDY lines are left in high impedance inactive state. Concluding status is sent by the slave on command/status bus portion 202 during the 32nd cycle of the final burst transfer series.

In order to avoid an underflow of the sender's buffer space (i.e., the sender running out of data in the middle of a 32-word stream) or an overflow of the receiver's buffer space (i.e., no more room in the receiver's buffer in the middle of a 32-word stream), the sender and receiver will not indicate readiness to proceed until the next 32 words to transmit are in the sender's buffer space, and the receiver's buffer space has an unused capacity of at least 32 words. In the preferred embodiment, the buffer space in each unit is smaller than the longest possible burst transmission. Therefore part of the transmission is loaded into the sender's buffer initially, and remaining portions of the transmission are loaded as the buffer is emptied. Similarly, part of the data received into the receiver's buffer is removed from the buffer for further processing before all of the data can be received. In one embodiment, the buffers consist of only as many words as the length of the data stream between pauses. In this case, the receiver's buffer must be completely emptied before it can indicate readiness to receive additional data, while the sender's buffer must be completely filled; it is possible, however, to overlap filling the sender's buffer and emptying the receiver's buffer with the transmission of data. In an alternative embodiment, the buffer space in each unit is divided into multiple buffers, each the size of a data stream between pauses. In this alternative embodiment, the units alternate use of the multiple buffers with each data stream, reducing the probability that a pause will be required.

Additional defined protocols exist for recovery from transmission errors. Generally, these are detected by bus timeout. I.e., an error causes the bus units to hold the bus lines at a certain state due to failure to complete a sequence. When the bus is thus frozen for a predefined bus timeout period, error recovery procedures are invoked. For example, if the receiver unit fails to acknowledge receipt of 31 words by activating its handshake line before the 32nd cycle, the sender waits until there is a bus timeout. Similarly, if the receiver activates its handshake line prematurely (before the completion of the 31st cycle), this is detected and a timeout occurs. The timeout condition is detected by arbitration logic 305, which triggers error recovery.

In the preferred embodiment, a burst data transfer is always an integral multiple of 32 data words (128 bytes). If the useful data required is not an integral multiple of 128 bytes, it is padded with additional dummy data to make the total data transfer an integral multiple of 128 bytes. This simplifies the protocol and the design of the bus units. In an alternative embodiment, it would be possible for the final date cycle to be of arbitrary length. In this case, both sender and receiver would have to know the count of the final byte and adjust their responses accordingly.

In the preferred embodiment, the number of words n transferred in an uninterrupted stream before any pause can take place is fixed for a particular hardware and software release of computer system 100. In an alternative embodiment, it would be possible to dynamically vary the predetermined length n of the uninterrupted data stream from time to time. For example, the operating system of system 100 could generate a command to all bus interface units to change the value of n, and all data transfers after such a command would operate with the new value. It would even be possible to vary the value of n with each burst transmission, as for example by specifying the value of n during the initialization phase. The value n must be predetermined in the sense that it be fixed for a particular burst transmission, and that it be known by both sender and receiver before the data transmission starts.

In the example of FIG. 5, the burst transmission contains four n-word streams of data. It should be understood that the actual number of streams and size of streams may vary. A particular advantage of the present invention is that the burst transmission may be longer than the total buffer space available in either the sender or receiver devices. The present invention thus frees the burst transfer protocol from the limits imposed by the size of the buffers in the sending and receiving devices. This makes it possible to support very long burst transfers (e.g., in excess of 1 megabytes), which would not otherwise be practical due to the large buffers required.

Although a specific embodiment of the invention has been disclosed along with certain alternatives, it will be recognized by these skilled in the art that additional variations in form and detail may be made within the scope of the following claims.

What is claimed is:

1. An apparatus for communicating between devices in a computer system, comprising:

an internal system communications bus having a plurality of communications lines;

a plurality of bus interface units attached to said communications bus, each of said interface units associated with one of a plurality of processor units, said processor units capable of operating at the same or different speeds from other of said processor units;

means for initializing a burst data transmission comprised of a plurality of uninterruptible streams of n data transfer cycles, where n is a predetermined integer greater than one, said burst data transmission between a first of said plurality of bus interface units and a second of said plurality of bus interface units wherein one of said first and second bus interface units takes control of said communications bus and maintains control until said burst data transmission is complete;

means in said first bus interface unit for transmitting said burst data to said second bus interface units;

means in said second bus interface units for receiving each of said uninterruptible streams of n data transfer cycles;

means to guarantee and generate a pause indication after transmission of each of said uninterruptible streams of n data transfer cycles;

pause detection means for detecting said pause indication; and pause means responsive to said pause detection means for pausing said burst data transmission.

2. The communications apparatus of claim 1, further comprising means for padding said burst data transmission with additional dummy data to make said burst data transmission an integral multiple of uninterruptible streams of n data transfer cycles.

3. The communications apparatus of claim 1, wherein said pausing means comprises means for pausing until a ready indication is received from said second bus interface unit.

4. The communication apparatus of claim 3, wherein said pause indication is a predefined signal level on a predefined communications line of said communications bus, and said ready indication is a change in said predefined signal level.

5. The communications apparatus of claim 1, further comprising means in at least one of said bus interface units for transmitting status of said bus interface unit after each of said uninterruptible streams of n data transfer cycles.

6. The communications apparatus of claim 1, wherein said means to guarantee and generate said pause indication further comprises:

means in one of said bus interface unit for generating a pause indication after transmission of an uninterruptible stream of n data transfer cycles; and pause detection means in other of said bus interface unit for detecting said pause indication.

7. The communications apparatus of claim 1, further comprising a buffer in each said bus interface unit, wherein the total buffer space in each said bus interface unit is at least one uninterruptible steam of n data transfer cycles, and is less than the total length of said burst data transmission.

8. A method of communicating data, comprising the steps of:

initializing a burst data transmission comprising a plurality of uninterruptible streams of n data transfer cycles between a sender device and a receiver device, said sender device and said receiver device each associated with its own processor, one of said processors capable of operating at the same or at different speeds than the other of said processors, and each of said devices attached to an internal systems communication bus wherein one of said sender and receiver devices takes control of said communications bus and maintains control until said burst data transmission is complete;

transmitting from said sender device, and uninterruptible stream of n data transfer cycles to said receiver device, where n is a predetermined integer greater than one;

checking by said sender device at the point of a pause indications from said receiver devices to determine if said receiver device can accept more data transfer cycles or if said sender device requires more time to transmit more of said data;

pausing, initiated by either said receiver or said sender device, is said step of checking at the point of a pause indications indicates that a pause is necessary; and repeating said transmitting, check and pausing steps to complete said burst data transmission.

9. The method of communicating of claim 8, further comprising the step of padding said burst data transmission with additional dummy data to make the total length of said data transmission an integral multiple of n data transfer cycles.

10. The method of communicating of claim 8, wherein said pausing step comprises pausing a variable length of time until a ready indication is received.

11. The method of communicating of claim 10, wherein said wait indication is a predefined signal level on a signal line of said communications bus, and wherein said ready indication is a change in said signal level.

12. The method of communicating of claim 8, wherein said sender device and said receiver device each contain a buffer for storage of data being transmitted, the total buffer space in each said device being at least n data transfer cycles, and less than the total length of said burst data transmission, said method further comprising the steps of:

placing a first stream of n data transfer cycles in the buffer of said sender device before transmitting said first stream of n data transfer cycles to said receiver device; and placing a second stream of n data transfer cycles in the buffer of said sender device after transmitting at least part of said first stream of n data transfer cycles to said receiver device.

13. A method of communicating data, comprising the steps of:

initializing a burst data transmission comprised of a plurality of uninterruptible streams of n data transfer cycles, where n is a predetermined integer greater than one between a sender device and a receiver device, each of said sender device and said receiver device associated with its own processor capable of operating at the same or at different speed than the other of said processor associated with the other of said devices and each of said devices attached to an internal systems communication bus, wherein one of said sender and receiver devices takes control of said communications bus and maintains control until said burst data transmission is complete;

transmitting, with said sender device, an uninterrupted stream of n data transfer cycles, where n is a predetermined integer greater than one;

acknowledging, with said receiver device, receipt of said stream of n data transfer cycles;

repeating said transmitting and acknowledging steps to complete said burst data transmission; and relinquishing control of said communications bus.

14. The method of communicating of claim 13, further comprising the step of padding said burst data transmission with additional data to make the total length of said data transmission an intergral multiple of n data transfer cycles.

15. The method of communicating of claim 13, wherein said acknowledging step comprises the steps of:

driving, with said receiver device, a first signal line of said communications bus with a predefined signal level during a predefined time interval following transmission of (n–1) transfer cycles of said uninterruptible stream of n data transfer cycles; and driving, with said sender device, a second signal line of said communications bus with a predefined signal level during a predefined time interval following said step of driving, with said receiver device, said first signal line.

16. The method of communicating of claim 15, wherein said acknowledging step further comprises the step of:

driving, with said receiver device, a portion of said communications bus with a plurality of signals indicating the status of said receiver device.

17. The method of communicating of claim 15, wherein said step of driving, with said receiver device, said first signal line comprises holding said first signal line at said predefined signal level until said receiver device is ready to receive more data.

18. The method of communicating of claim 17, wherein said step of driving, with said sender device, said second signal line comprises holding said second signal line at said predefined signal level until said sender device is ready to transmit more data.

19. A first bus interface unit attaching to a communications bus of a computer system, said first bus interface unit comprising:

means for initializing a burst data transmission comprised of a plurality of uninterruptible streams of n data transfer cycles, where n is a predetermined integer greater than one, said burst data transmission between said first and a second bus interface unit, each of said first and second bus interface unit associated with its own processor, said processors capable of operating at the same or different speeds, and both of said first and second bus interface units attached to an internal system communications bus, wherein said first bus interface unit takes control of said communications bus and maintains control until said burst data transmission is complete;

means for successively transmitting uninterrupted streams of n data transfer cycles in said burst data transmission to said second unit, where n is predetermined integer greater than one;

pause detection means for detecting a pause indication from said second bus interface unit at intervals between said uninterrupted streams of n data transfer cycles, said second bus interface unit generating said pause indication when said second bus interface unit is unable to accept more data; and means responsive to said pause detection means for pausing said burst data transmission at said intervals.

20. The first bus interface unit of claim 19, further comprising a buffer for storage of data being transmitted, wherein the total buffer space in said first bus interface unit is a least n data transfer cycles, and is less than the total length of said burst data transmission.

21. The first bus interface unit of claim 19, further comprising means for padding said burst data transmission with additional dummy data to make the total length of said data transmission an integral multiple of n data transfer cycles.

22. The first bus interface unit of claim 19, wherein said pausing means comprises means for pausing until a ready indication is received from said second bus unit.

23. The first bus interface unit of claim 22, wherein said pause indication is a predefined signal level on a predefined communications line of said communications bus, and said ready indication is a change in said predefined signal level.

24. The first bus interface unit of claim 19, wherein said first bus unit is capable of operating in receive mode, wherein said second bus unit is capable of operating in send mode, and wherein said second unit comprises means for successively transmitting a plurality of uninterruptible streams of n data transfer cycles in a burst data transmission to said first unit, pause detection means for detecting a pause indication from said first bus interface unit at intervals between each of said uninterruptible streams of n data transfer cycles, and means responsive to said pause detection means for pausing said burst data transmission at said intervals, said first bus interface unit further comprising:

means for receiving each of said uninterruptible streams of n data transfer cycles when operating in receive mode; and means for generating a pause indication after receipt of each of said uninterruptible streams of n data transfer cycles when operating in receive mode.

25. The first bus interface unit of claim 24, wherein said means for generating a pause indication comprises means for driving a predefined signal level on a predefined communications line of said communications bus.

26. The first bus interface unit of claim 25, further comprising means for padding said burst data transmission with additional dummy data to make the total length of said data transmission an integral multiple of n data transfer cycles.

27. A first bus interface unit comprising:

means for initializing a burst data transmission between said first and a second bus interface unit, both of said interface units attached to an internal system communications bus and each of said interface units associated with its own processor capable of operating at the same or different speeds than said processor associated with the other of said interface unit, wherein said first bus interface unit takes control of said communications bus and maintains control until said burst data transmission is complete;

means for receiving successive uninterrupted streams of n data transfer cycles from said second bus interface unit, where n is a predetermined integer greater than one, said uninterrupted streams of n data transfer cycles being part of a single burst data transmission; and means for generating a pause indication after receipt of an uninterrupted stream of n data transfer cycles, said generating means operating when said first bus interface unit is unable to accept more data.

28. The first bus interface unit of claim 27, further comprising a buffer for storage of data being transmitted, wherein the total buffer space in said first bus interface unit is at least n data transfer cycles, and is less than the total length of said burst data transmission.

29. The first bus interface unit of claim 27, further comprising means for generating a ready indication when said first unit is ready to receive additional data.

30. The first bus interface unit of claim 29, wherein said pause indication is a predefined signal level on a predefined communications line of said communications bus, and said ready indication is a change in said predefined signal level.

* * * * *